(12) United States Patent
Kwak et al.

(10) Patent No.: US 8,580,332 B2
(45) Date of Patent: Nov. 12, 2013

(54) THIN-FILM BATTERY METHODS FOR COMPLEXITY REDUCTION

(75) Inventors: Byung-Sung Kwak, Portland, OR (US); Nety M. Krishna, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 350 days.

(21) Appl. No.: 12/882,009

(22) Filed: Sep. 14, 2010

(65) Prior Publication Data

US 2011/0129594 A1    Jun. 2, 2011

Related U.S. Application Data

(60) Provisional application No. 61/244,798, filed on Sep. 22, 2009.

(51) Int. Cl.
| | |
|---|---|
| B05D 5/12 | (2006.01) |
| B05C 11/00 | (2006.01) |
| G03G 13/16 | (2006.01) |
| C23C 16/00 | (2006.01) |

(52) U.S. Cl.
USPC .............. 427/58; 118/600; 118/719; 429/126

(58) Field of Classification Search
USPC ........................................................ 427/58
See application file for complete search history.

(56) References Cited

U.S. PATENT DOCUMENTS

| | | | |
|---|---|---|---|
| 5,445,906 A | 8/1995 | Hobson et al. | |
| 5,561,004 A * | 10/1996 | Bates et al. | 429/162 |
| 5,925,227 A | 7/1999 | Kobayashi et al. | |
| 6,025,094 A | 2/2000 | Visco et al. | |
| 6,146,225 A * | 11/2000 | Sheats et al. | 445/24 |
| 6,402,796 B1 * | 6/2002 | Johnson | 29/623.5 |
| 6,576,371 B1 * | 6/2003 | Yasuda et al. | 429/309 |
| 6,994,933 B1 * | 2/2006 | Bates | 429/162 |
| 2002/0150823 A1 * | 10/2002 | Breitkopf et al. | 429/245 |
| 2004/0048157 A1 | 3/2004 | Neudecker et al. | |
| 2005/0191547 A1 | 9/2005 | Konishiike et al. | |
| 2007/0125638 A1 | 6/2007 | Zhang et al. | |
| 2009/0061319 A1 | 3/2009 | Kim et al. | |

FOREIGN PATENT DOCUMENTS

| | | |
|---|---|---|
| JP | 2009-009897 | 1/2009 |
| JP | 2009-064667 | 3/2009 |

OTHER PUBLICATIONS

International Search Report and Written Opinion from PCT/US2010/049535 mailed Jun. 3, 2011, 10 pgs.
International Preliminary Report on Patentability from PCT/US2010/049535 mailed Apr. 5, 2012, 7 pgs.

* cited by examiner

*Primary Examiner* — Dah-Wei Yuan
*Assistant Examiner* — Kristen A Dagenais
(74) *Attorney, Agent, or Firm* — Blakely Sokoloff Taylor & Zafman LLP

(57) ABSTRACT

Thin-film battery methods for complexity reduction are described. Processing equipment arrangements suitable to support thin-film battery methods for complexity reduction are also described. Cluster tools to support thin-film battery methods for complexity reduction are also described.

7 Claims, 8 Drawing Sheets

THIN-FILM BATTERY METHODS FOR COMPLEXITY REDUCTION

CROSS REFERENCE TO RELATED APPLICATIONS

This application claims the benefit of U.S. Provisional Application No. 61/244,798, filed Sep. 22, 2009, the entire contents of which are hereby incorporated by reference herein.

BACKGROUND

1) Field

Embodiments of the present invention pertain to the field of thin-film batteries and, in particular, to thin-film battery methods for complexity reduction.

2) Description of Related Art

Recent efforts towards scaling the dimensions of thin-film batteries to include ever smaller features while increasing capacities for high volume manufacturing of such thin-film batteries have mostly relied on traditional thin-film battery manufacturing methods and techniques. Such traditional methods and techniques may include the use of a shadow mask, or a set of shadow masks, at each and every deposition operation in a typical thin-film battery process flow. For example, in a conventional process, a processing tool is loaded with a shadow mask, deposition of a single layer is performed in the processing tool, and a first shadow mask is then unloaded for replacement with a second shadow mask intended for another deposition operation.

Furthermore, deposition chambers or processing tools for thin-film battery manufacturing are typically fitted with glove boxes having an ambient atmosphere suitable to manage and protect the deposition materials housed in the deposition chamber or processing tool. Such care must often be taken because the deposition materials are often sensitive to normal atmospheric conditions. In some cases, the deposition materials are so sensitive to normal atmospheric conditions that they combust when exposed to these conditions.

FIG. 1 illustrates an example of a conventional equipment arrangement for manufacturing thin-film batteries. Referring to FIG. 1, a deposition tool 100 suitable for thin-film battery manufacture is equipped with a glove box 102. For example, glove box 102 is typically included with a deposition tool 100 associated with deposition processes. Although not depicted, additional glove boxes are required for use with a lithium chamber or other chambers or processing tools used subsequent to, e.g., air-sensitive layer deposition processes.

DETAILED DESCRIPTION

Figure 1:
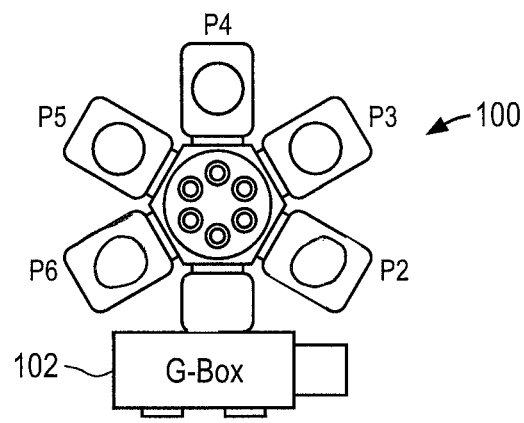
FIG. 1 illustrates an example of a conventional equipment arrangement for manufacturing thin-film batteries.

Thin-film battery methods for complexity reduction are described. In the following description, numerous specific details are set forth, such as fabrication conditions and material regimes, in order to provide a thorough understanding of the present invention. It will be apparent to one skilled in the art that the present invention may be practiced without these specific details. In other instances, well-known features, such as facility layouts, are not described in detail in order to not unnecessarily obscure the present invention. Furthermore, it is to be understood that the various embodiments shown in the Figures are illustrative representations and are not necessarily drawn to scale. Additionally, other arrangements and configurations may not be explicitly disclosed in embodiments herein, but are still considered to be within the spirit and scope of the invention. In addition, adaptation for other substrate sizes beyond that described in embodiments herein is considered to be within the spirit and scope of embodiments of the present invention.

Disclosed herein is a method for fabricating thin-film batteries. In an embodiment, a method is provided that reduces complexity as compared with conventional fabrication approaches. In an embodiment, an integration scheme provides a thin-film battery manufacturing approach suitable for complexity reduction. In an embodiment, a processing equipment arrangement is configured for suitability to support thin-film battery methods for complexity reduction. In an embodiment, a cluster tool is configured for suitability to support thin-film battery methods for complexity reduction.

The presence of air-sensitive layers in a thin-film battery stack may require manufacturing equipment and processes suitable for ensuring that such thin film layers (e.g., positive and negative electrode layers) are not exposed to air ambient. One solution that has been employed throughout the history of thin-film battery development and (small scale) manufacturing is the use of glove box with a controlled argon inert ambient. The argon ambient may be integrated with appropriate deposition tools and process chambers. This approach may enable protection of any sensitive deposited layers, as well protection of deposition laden masks, from the oxidants present in normal air ambient, e.g., oxygen ($O_2$), water ($H_2O$), nitrogen ($N_2$), carbon monoxide (CO) and carbon dioxide ($CO_2$).

The argon ambient glove box approach, however, may add both cost and complexity to an overall integration and manufacturing scheme for fabricating thin-film batteries. Such problems may be exacerbated when such technologies are ramped for high volume manufacturing and automation. The additional costs result for both capital (e.g., additional components of an equipment) and operational (e.g., glove box operation and complexity in automating operations within a glove box) aspects.

In accordance with an embodiment of the present invention, the concepts and examples provided herein allow for elimination of some or all of the above requirement to provide improved thin-film battery manufacturing schemes. In an embodiment, an improved thin-film battery process integration scheme along with suitable corresponding chamber configurations is provided. In an embodiment, the use of new chambers to eliminate the inert ambient requirement of traditional thin-film battery manufacturing processes is described as an approach to address the issues described above with respect to conventional thin-film battery manufacturing technologies.

In accordance with an embodiment of the present invention, thin-film battery manufacturing processes are simplified. In one embodiment, a thin-film battery process integration is provided for natural protection of reactive layers. In one embodiment, manufacturing complexity and cost for thin-film batteries is reduced. In one embodiment, a normal air ambient-compatible integration process scheme for fabricating thin-film batteries is provided. In one embodiment, a process integration scheme for fabricating thin-film batteries is provided for improved automation. In one embodiment, Smart Cluster Tools are used for thin-film battery integration.

Figure 2:
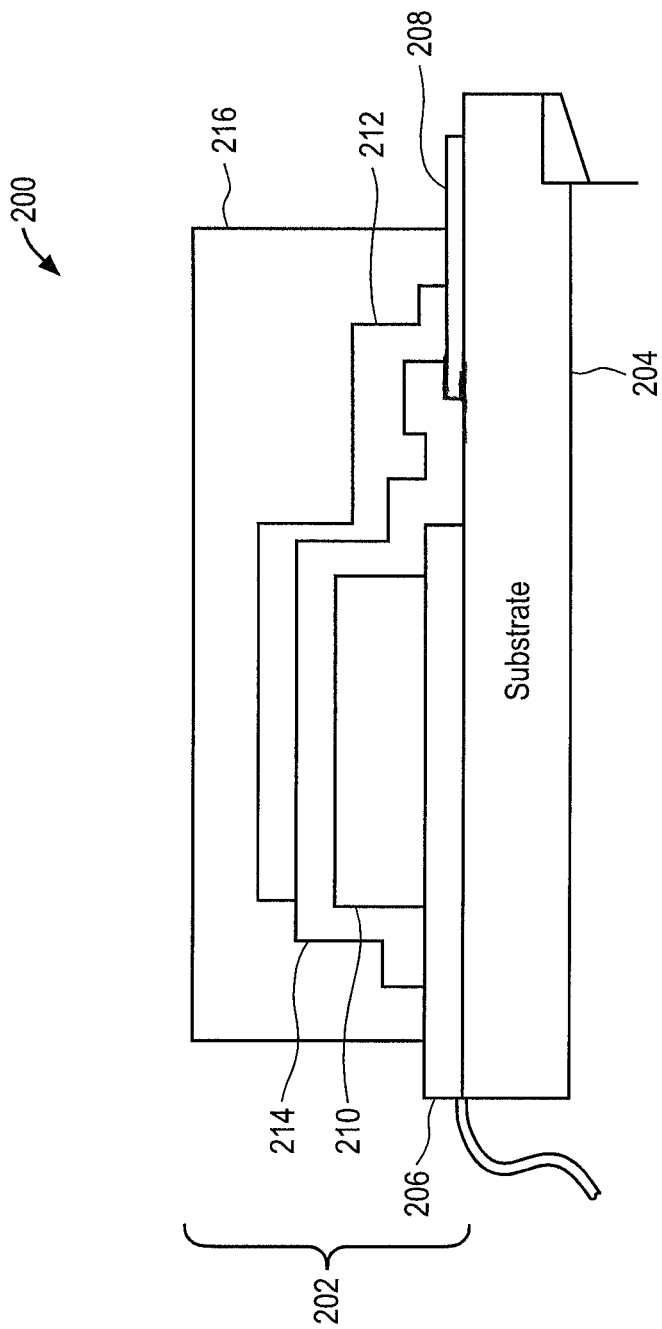
FIG. 2 illustrates a cross-sectional view of a representative thin-film battery contemplated for fabrication by the manufacturing processes and tooling arrangements described herein, in accordance with an embodiment of the present invention.

A variety of thin-film battery architectures may be contemplated for fabrication with the processes and tooling arrangements described herein. FIG. 2 illustrates a cross-sectional view of a representative thin-film battery contemplated for fabrication by the manufacturing processes and tooling arrangements described herein, in accordance with an embodiment of the present invention. Referring to FIG. 2, a thin film battery 200 includes a stack of layers 202 fabricated on a substrate 204. The stack of layers 202 includes a cathode current collector layer 206, an anode current collector layer 208, a cathode layer 210, an anode layer 212, an electrolyte layer 214, and a protective coating layer 216. In an embodiment, the stack of layers 202 has a thickness of approximately 15 microns. In an embodiment, anode layer 212 of thin-film battery 200 is a lithium anode layer. It is to be understood, however, that FIG. 2 illustrates only one possible arrangement for a thin-film battery structure, and that the concepts disclosed herein can be applied to any thin-film battery structure fabricated, e.g., by conventional process flow and integration schemes, as well as different battery stack arrangements.

Figure 3:
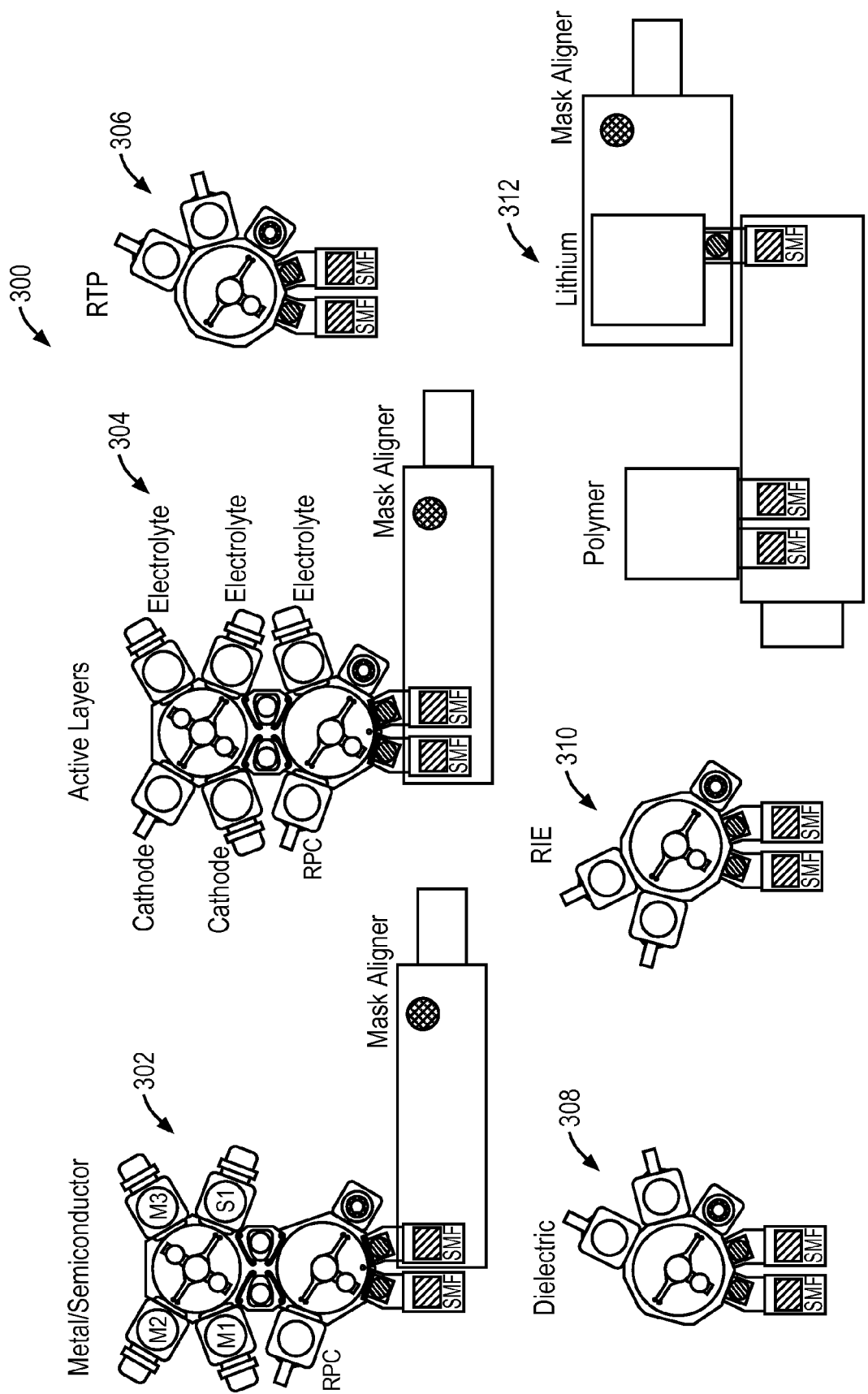
FIG. 3 illustrates a 200 millimeter thin-film battery manufacturing factory using a masked process, in accordance with an embodiment of the present invention.

In an aspect of the present invention, a method of accommodating an inert ambient requirement (e.g., for a lithium anode layer) is provided. FIG. 3 illustrates a 200 millimeter thin-film battery manufacturing factory using a masked process (e.g., using shadow masks), in accordance with an embodiment of the present invention. Referring to FIG. 3, a factory 300 for fabrication of a thin-film battery includes a first process tool 302 for depositing metal or semiconductor layers, a second process tool 304 for depositing active layers, a third process tool 306 for rapid thermal processing (or a furnace) if needed, a fourth process tool 308 for depositing dielectric layers, a fifth process tool 310 for performing reactive ion etching, and a sixth process tool 312 for depositing specialty layers for thin-film batteries. In accordance with an embodiment of the present invention, sixth process tool 312 is configured for deposition of both a lithium layer (e.g. a lithium anode layer) and a polymer layer in the same process tool, as depicted in FIG. 3.

With reference to the process tools depicted in FIG. 3 and described above, vacuum transfer modules may be used for tool-to-tool substrate transfer. In accordance with an embodiment of the present invention, a vacuum transfer module is a storage chamber that can be attached and detached from a facet of a processing tool (e.g., from a facet of an Endura or Centura platform, available from Applied Materials) to transfer substrates, stacks, or the like, from one process tool to another. In one embodiment, a vacuum transfer chamber is vacuum compatible or is back-filled with argon.

Figure 4:
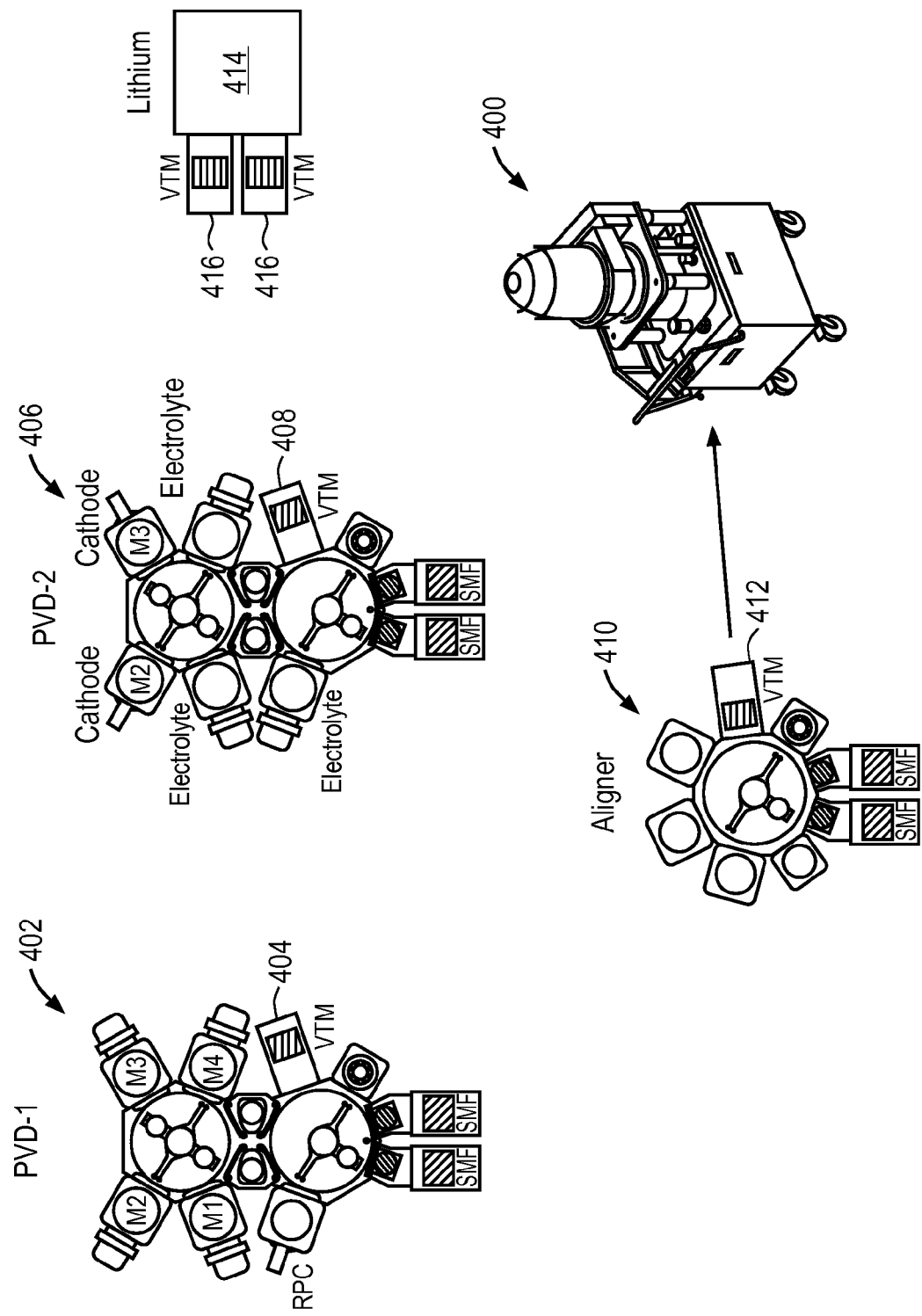
FIG. 4 illustrates a vacuum transfer module compatible with various forms of processing equipment, in accordance with an embodiment of the present invention.

FIG. 4 illustrates a vacuum transfer module compatible with various forms of processing equipment, in accordance with an embodiment of the present invention. Referring to FIG. 4, a vacuum transfer module 400 is compatible with a first physical vapor deposition chamber 402 having a facet 404, a second physical vapor deposition chamber 406 having a facet 408, an aligner 410 having a facet 412, and with a lithium deposition chamber 414 having a first facet 416 and a second facet 418 suitable for interaction with vacuum transfer module 400.

Figure 5:
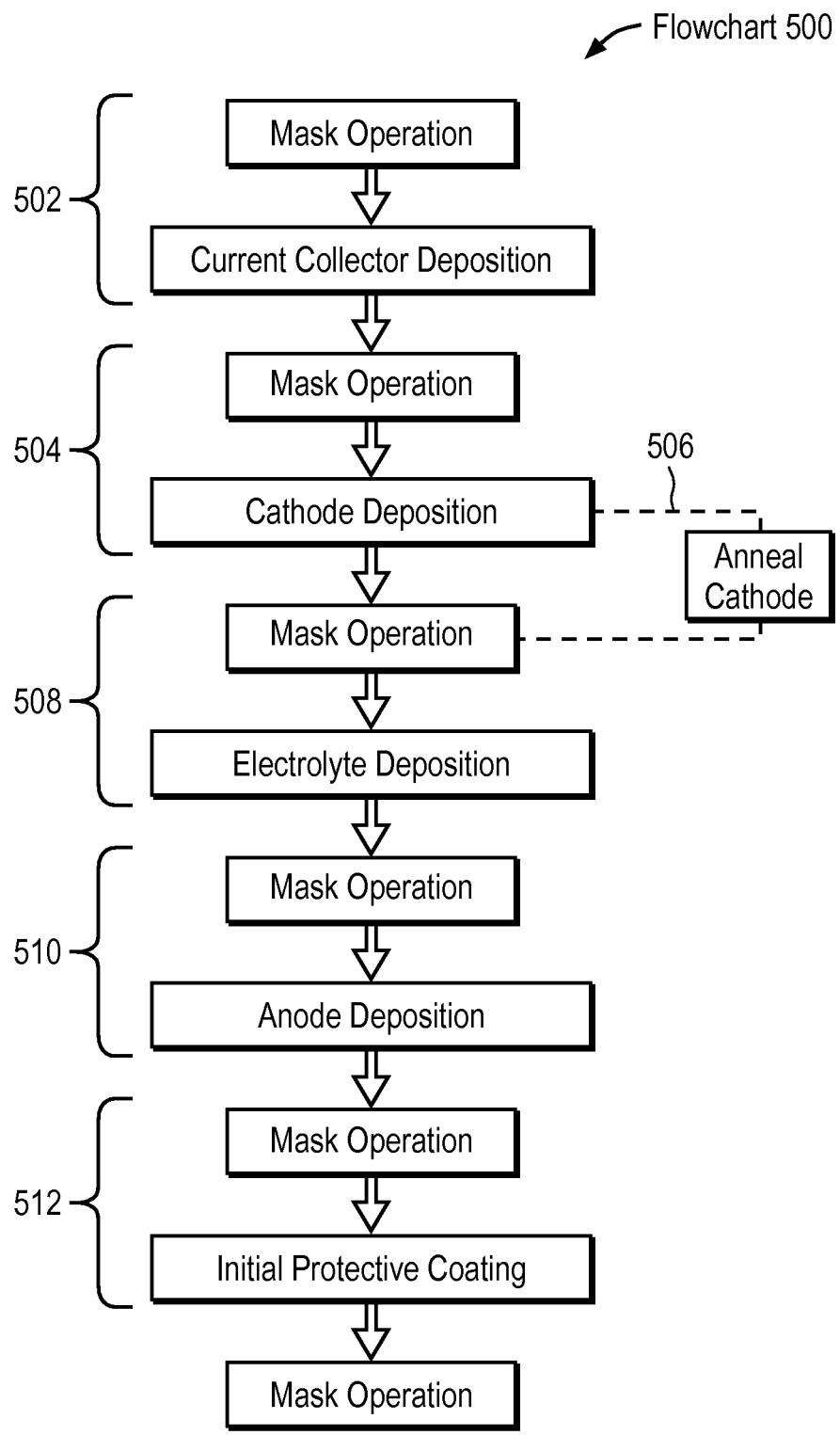
FIG. 5 illustrates a Flowchart representing operations in an integration scheme for fabricating a thin-film battery, in accordance with conventional methods.

In another aspect of the present invention, an arrangement of different processing tools may be used to fabricate a thin-film battery. FIG. 5 illustrates a Flowchart 500 representing operations in an integration scheme for fabricating a thin-film battery, in accordance with conventional methods. Referring to operation 502 of Flowchart 500, a thin-film battery manufacturing process includes a patterned deposition of a current collector layer. Referring to operation 504 of Flowchart 500, a thin-film battery manufacturing process includes a patterned deposition of a cathode layer. Referring to operation 506 of Flowchart 500, a thin-film battery manufacturing process includes annealing of the cathode layer (optional). Referring to operation 508 of Flowchart 500, a thin-film battery manufacturing process includes a patterned deposition of an electrolyte layer. Referring to operation 510 of Flowchart 500, a thin-film battery manufacturing process includes a patterned deposition of an anode layer. And, referring to operation 512 of Flowchart 500, a thin-film battery manufacturing process includes deposition of a protective coating layer. Depending on the requirements of the actual thin-film battery stack, post-deposition patterning can also be performed subsequent to the above operations.

With reference to the operations in FIG. 5, a shadow mask-based patterning operations is typically performed with each operation. For such an approach, if the mask placement or alignment is performed ex situ, then a substrate is loaded into a tool or chamber as a stack (mask and substrate, along with some holding mechanism). Subsequently, the deposition of the particular layer is performed. The above operation is followed by stack removal and by mask replacement for a subsequent layer deposition. In accordance with an embodiment of the present invention, this approach may prove difficult for deposition of the positive and negative electrode layers. For example, positive electrodes (e.g., a cathode) may be hygroscopic and reactive, particularly when the as-deposited material is amorphous and sub-stoichiometric. In another example, the negative electrode for thin-film batteries has traditionally been lithium, although the same technologies being explored in bulk lithium-Ion battery technologies, such as tin, aluminum, silicon, etc. and lithium alloys of these metals, can be incorporated as well. Either way, lithium and alloys thereof may be highly reactive in normal air ambient conditions (and even more so with increased humidity), and thus may require some sort of protective measure.

In another aspect of the present invention, even if a particular lithium species is not extremely reactive, the amount of lithium typically present in a thin-film battery may be so small (e.g., a few to several microns, compared to several tens of microns for bulk lithium metal batteries) that any extent of such reactions and resulting surface layers may result in thin-film batteries with lower performance and yield. In an embodiment, even if the mask attachment and alignment is performed in situ, a similar situation may arise for the anode layer. As such, the as-deposited sensitive or reactive layers may need protection from ambient air conditions.

In accordance with an embodiment of the present invention, the solutions described herein provide an improved, cost effective, complexity reducing and highly scaleable manufacturing technology. In accordance with an embodiment of the present invention, instead of completing a sensitive or reactive layer deposition in an isolated fashion, the deposition operation is extended with an additional deposition. In an embodiment, the additional deposition provides an amount of a non-reactive or less reactive material sufficient to cover any exposed reactive layers. In one embodiment, the additional deposition provides a stable layer prior to ending a process operation. In one embodiment, the additional deposition is performed prior to a subsequent mask replacement.

In accordance with another embodiment of the present invention, chambers or cluster tools capable of accommodating the above thin-film battery integration approach are provided. The chambers or cluster tools may provide another avenue for protecting a sensitive or reactive layer prior to exposure of the supporting substrate to ambient air conditions, e.g., prior to removal from the chamber or cluster tool. For example, in one embodiment, deposition of an electrolyte layer is performed subsequent to deposition of a cathode layer, but prior to removal of a substrate from a chamber or cluster tool (removal that would otherwise expose the cathode layer top to air ambient conditions.) In a specific embodiment, a lithium evaporation operation is not considered complete until the operation is followed by, e.g., a simple metal deposition of a less or non-reactive metal layer on the resulting lithium layer.

Figure 6:
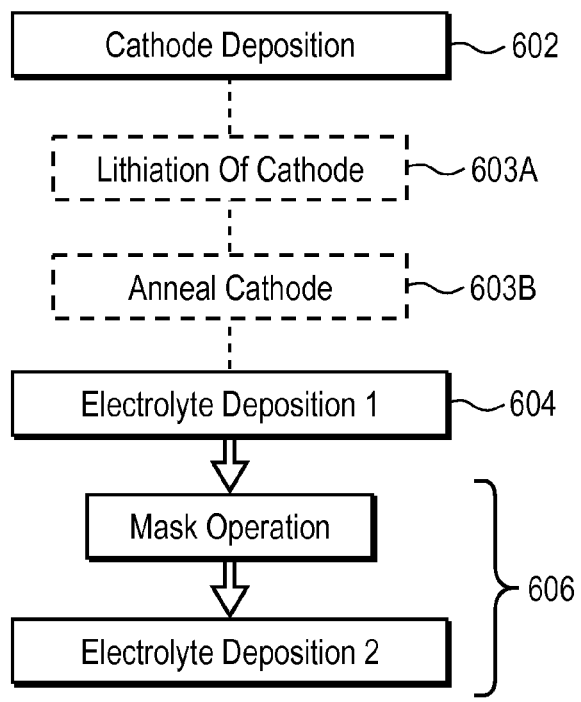
FIG. 6 illustrates a Flowchart representing operations in an integration scheme for fabricating a thin-film battery, in accordance with an embodiment of the present invention.

In a particular embodiment, a subsequent deposition of an electrolyte layer is performed on a cathode layer without exposing the cathode layer to air ambient in between the deposition processes. FIG. 6 illustrates a Flowchart 600 representing operations in an integration scheme for fabricating a thin-film battery, in accordance with an embodiment of the present invention. Referring to operation 602 of Flowchart 600, a thin-film battery manufacturing process includes deposition of a cathode layer. Referring to optional operation 603a, in one embodiment, the cathode layer is lithiated after deposition of a foundational cathode material which may or may not already include lithium. Referring to optional operation 603b, in one embodiment, the cathode layer is annealed, e.g., by heating the cathode layer. Referring to operation 604 of Flowchart 600, without exposing the cathode layer to ambient air conditions, an electrolyte layer is then formed on the cathode layer. Referring to operation 606 of Flowchart 600, a second electrolyte layer deposition operation, including a mask operation, is performed. In the event that the substrate on which the above layers are deposited is exposed to air ambient, the electrolyte layer protects the cathode layer prior to the mask and second electrolyte deposition operations.

Accordingly, in an embodiment, a method of fabricating a thin-film battery includes forming, above a substrate, a cathode layer of the thin-film battery. The method of fabricating the thin-film battery also includes, without exposing the cathode layer to air ambient, forming an electrolyte layer on the cathode layer. In one embodiment, the method of fabricating the thin-film battery also includes, prior to forming the electrolyte layer, lithiating the cathode layer. In one embodiment, the method of fabricating the thin-film battery also includes, prior to forming the electrolyte layer, annealing the cathode layer. In one embodiment, the method of fabricating the thin-film battery also includes, prior to forming the electrolyte layer, lithiating the cathode layer and, subsequently, annealing the cathode layer. In one embodiment, the method of fabricating the thin-film battery also includes, subsequent to forming the electrolyte layer, exposing the substrate to air ambient, then masking the electrolyte layer and, then, forming a second electrolyte layer above the electrolyte layer.

Figure 7:
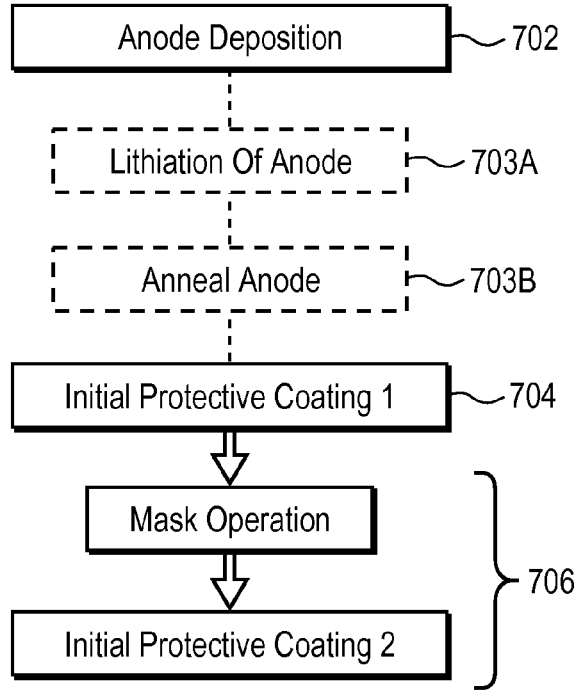
FIG. 7 illustrates a Flowchart representing operations in an integration scheme for fabricating a thin-film battery, in accordance with an embodiment of the present invention.

In another particular embodiment, a subsequent deposition of a metal layer, a dielectric layer, a dielectric-organic composite layer, or an organic layer is performed on an anode layer without exposing the anode layer to air ambient in between the deposition processes. FIG. 7 illustrates a Flowchart 700 representing operations in an integration scheme for fabricating a thin-film battery, in accordance with an embodiment of the present invention. Referring to operation 702 of Flowchart 700, a thin-film battery manufacturing process includes deposition of an anode layer. Referring to optional operation 703a, in one embodiment, the anode layer is lithiated after deposition of a foundational anode material which may or may not already include lithium. Referring to optional operation 703b, in one embodiment, the anode layer is annealed, e.g., by heating the anode layer. Referring to operation 704 of Flowchart 700, without exposing the anode layer to ambient air conditions, an initial protective coating layer is then formed on the anode layer. Referring to operation 706 of Flowchart 700, a second coating layer deposition operation, including a mask operation, is performed. In the event that the substrate on which the above layers are deposited is exposed to air ambient, the initial protective coating layer protects the anode layer.

Accordingly, in an embodiment, a method of fabricating a thin-film battery includes forming, above a substrate, an anode layer of the thin-film battery. The method of fabricating the thin-film battery also includes, without exposing the anode layer to air ambient, forming an initial protective coating layer on the anode layer. In one embodiment, the method of fabricating the thin-film battery also includes, prior to forming the initial protective coating layer, lithiating the anode layer. In one embodiment, the method of fabricating the thin-film battery also includes, prior to forming the initial protective coating layer, annealing the anode layer. In one embodiment, the method of fabricating the thin-film battery also includes, prior to forming the initial protective coating layer, lithiating the anode layer and, subsequently, annealing the anode layer. In one embodiment, the method of fabricating the thin-film battery also includes, subsequent to forming the initial protective coating layer, exposing the substrate to air ambient, then masking the initial protective coating layer and, then, forming a second initial protective coating layer above the initial protective coating layer.

In another aspect of the present invention, it may be the case that a coating layer for a thin-film battery is not electrically conductive and contact to a current collector layer is established at the underside of an anode layer. Thus, in accordance with an embodiment of the present invention, for a composite anode layer, a cluster tool is configured to perform both lithium and an alloying component, followed by a subsequent deposition of an air-stable layer. In one embodiment, the unidirectional nature of sputtering and the limitations of shadow masks (e.g., a minute gap between substrate and mask) provide a smooth transition resulting in coverage by a protective coating layer.

Figure 8:
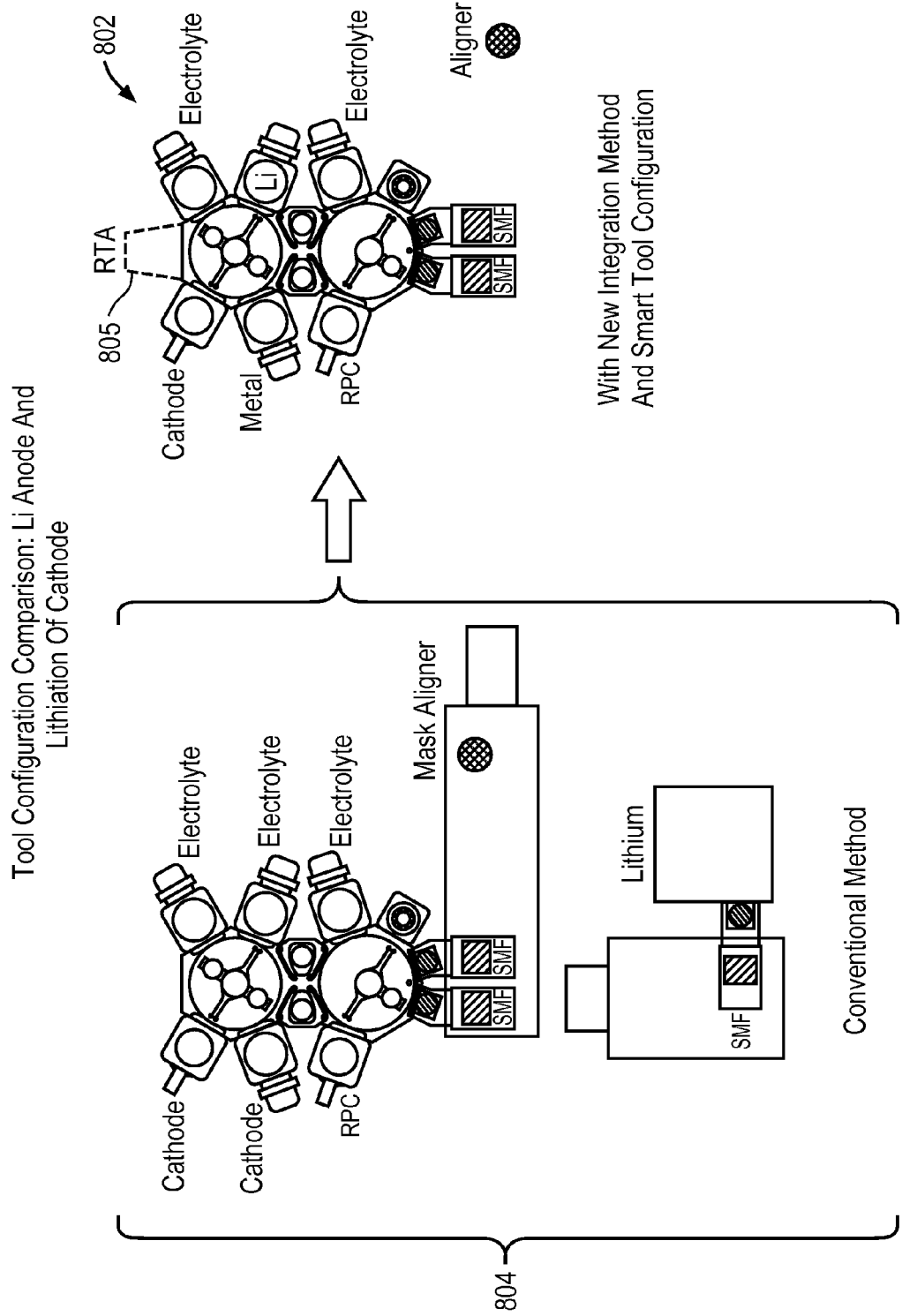
FIG. 8 illustrates an arrangement of a cluster tool suitable for thin-film battery methods for complexity reduction, versus a conventional arrangement of processing equipment, in accordance with an embodiment of the present invention.

FIG. 8 illustrates an arrangement of a cluster tool suitable for thin-film battery methods for complexity reduction, versus a conventional arrangement of processing equipment, in accordance with an embodiment of the present invention. Referring to FIG. 8, a cluster tool 802 is configured to accommodate a process flow with ex situ mask alignment. A conventional tool configuration 804 is also depicted. In an embodiment, cluster tool 802 has additional chambers to accommodate additional protective deposition operations, as described above. In one embodiment, cluster tool 802 includes a showerhead-based lithium evaporator 806. In a specific embodiment, by incorporating showerhead-based lithium evaporator 806 into cluster tool 802, the need for ex situ transfer from tool-to-tool is eliminated. In an embodiment, the cluster tool 802 includes an annealing chamber 805, such as a rapid thermal anneal (RTA chamber), as depicted in FIG. 8.

Accordingly, in an embodiment, a cluster tool for fabricating a thin-film battery includes a first chamber for forming, above a substrate, a cathode layer of the thin-film battery. The cluster tool for fabricating the thin-film battery also includes a second chamber for forming an electrolyte layer on the cathode layer. In one embodiment, the cluster tool for fabricating the thin-film battery also includes a third chamber for, prior to forming the electrolyte layer, lithiating the cathode layer. In one embodiment, the cluster tool for fabricating the thin-film battery also includes a third chamber for, prior to forming the electrolyte layer, annealing the cathode layer. In one embodiment, the cluster tool for fabricating the thin-film battery also includes a third chamber for, prior to forming the electrolyte layer, lithiating the cathode layer and a fourth chamber for, subsequently, annealing the cathode layer. In a specific embodiment, one or more of the chambers of the cluster tool includes a showerhead-based lithium evaporator.

In another embodiment, a cluster tool for fabricating a thin-film battery includes a first chamber for forming, above a substrate, an anode layer of the thin-film battery. The cluster tool for fabricating the thin-film battery also includes a second chamber for forming an initial protective coating layer on the anode layer. In one embodiment, the cluster tool for fabricating the thin-film battery also includes a third chamber for, prior to forming the initial protective coating layer, lithiating the anode layer. In one embodiment, the cluster tool for fabricating the thin-film battery also includes a third chamber for, prior to forming the initial protective coating layer, annealing the anode layer. In one embodiment, the cluster tool for fabricating the thin-film battery also includes a third chamber for, prior to forming the initial protective coating layer, lithiating the anode layer and a fourth chamber for, subsequently, annealing the anode layer. In a specific embodiment, one or more of the chambers of the cluster tool includes a showerhead-based lithium evaporator.

Figure 9:
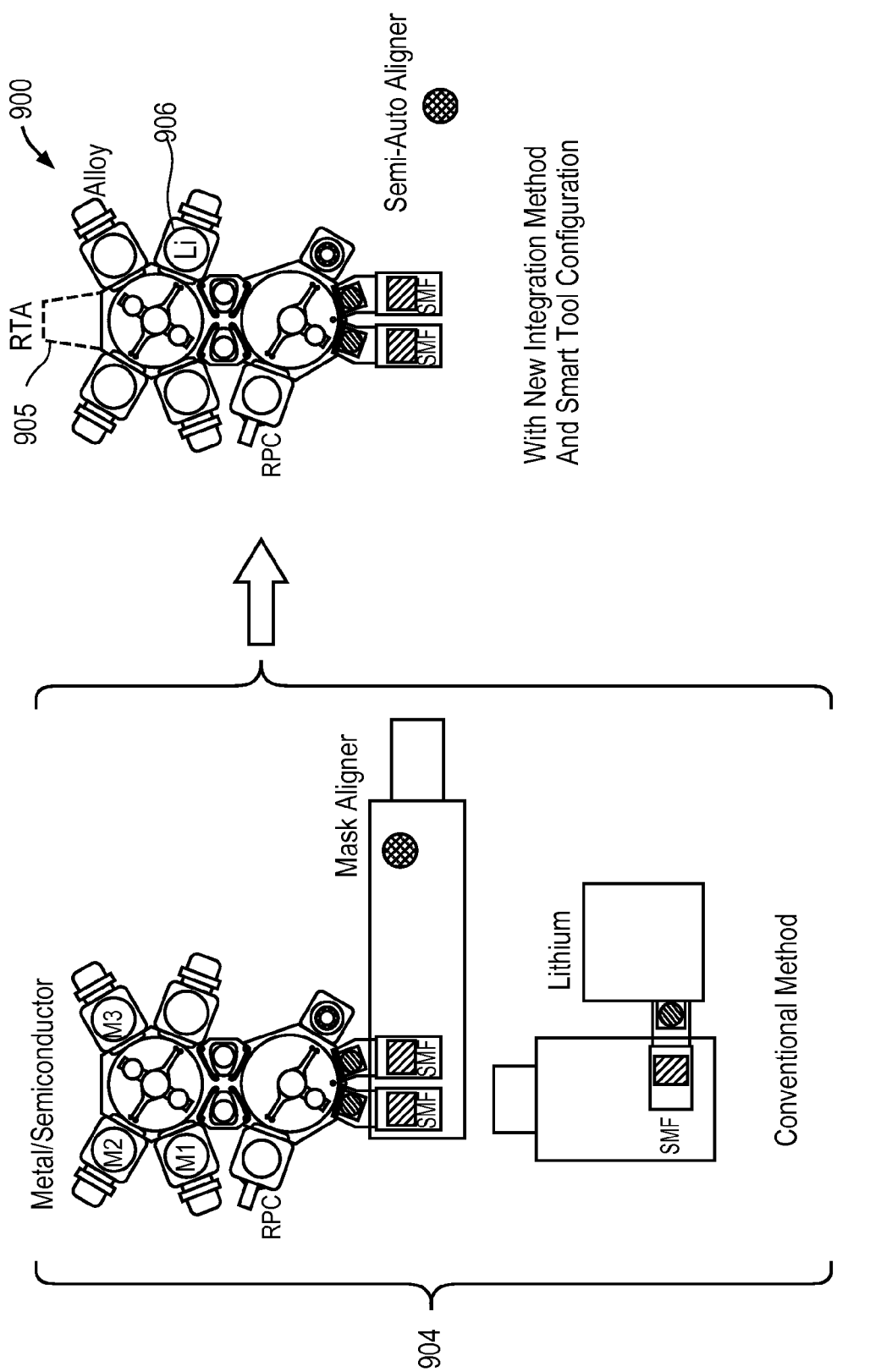
FIG. 9 illustrates an arrangement of a cluster tool suitable for thin-film battery methods for complexity reduction, versus a conventional arrangement of processing equipment, in accordance with an embodiment of the present invention.

A cluster tool arrangement may also be considered for an alloy negative electrode, e.g., an anode including silicon. FIG. 9 illustrates an arrangement of a cluster tool suitable for thin-film battery methods for complexity reduction, versus a conventional arrangement of processing equipment, in accordance with an embodiment of the present invention. Referring to FIG. 9, a cluster tool 902 is configured to accommodate a process flow with ex situ mask alignment. A conventional tool configuration 904 is also depicted. In an embodiment, cluster tool 902 has additional chambers to accommodate additional protective deposition operations, as described above. In one embodiment, an on-board lithium chamber 906 allows for silicon-lithium-silicon or lithium-silicon (silicon-on-top) types of deposition. In an embodiment, the cluster tool 902 includes an annealing chamber 905, such as a rapid thermal anneal (RTA chamber), as depicted in FIG. 9. Although this example is shown with a 200 millimeter Si-IC platform and chamber, the same concept can be extended to 300 millimeter and in-line tools.

Thus, methods for fabricating thin-film batteries have been disclosed. In accordance with an embodiment of the present invention, a method is provided to reduce complexity as compared with conventional fabrication approaches. In an embodiment, a processing equipment arrangement is configured for suitability to support thin-film battery methods for complexity reduction. In an embodiment, a cluster tool is configured for suitability to support thin-film battery methods for complexity reduction.

What is claimed is:

1. A method of fabricating a thin-film battery, the method comprising:
    forming, above a substrate, a first electrolyte layer on a cathode layer of the thin-film battery in an atmosphere inert to the cathode layer; and, subsequently,
    exposing the first electrolyte layer to an atmosphere substantially comprising $O_2$, $H_2O$, $N_2$, $CO$ and $CO_2$; and, subsequently,
    masking the first electrolyte layer; and, subsequently,
    forming a second electrolyte layer above the first electrolyte layer.

2. The method of claim 1, further comprising:
    prior to forming the first electrolyte layer, lithiating the cathode layer.

3. The method of claim 1, further comprising:
    prior to forming the first electrolyte layer, annealing the cathode layer.

4. The method of claim 1, further comprising:
    prior to forming the first electrolyte layer, lithiating the cathode layer; and, subsequently, annealing the cathode layer.

5. The method of claim 1, wherein the cathode layer is formed in a first chamber for of a cluster tool, and the first electrolyte layer is formed in a second chamber of the cluster tool.

6. The method of claim 2, wherein the cathode layer is formed in a first chamber for of a cluster tool, the first electrolyte layer is formed in a second chamber of the cluster tool, and lithiating the cathode layer is performed in a third chamber of the cluster tool.

7. The method of claim 3, wherein the cathode layer is formed in a first chamber for of a cluster tool, the first electrolyte layer is formed in a second chamber of the cluster tool, and annealing the cathode layer is performed in a third chamber of the cluster tool.

* * * * *

UNITED STATES PATENT AND TRADEMARK OFFICE
CERTIFICATE OF CORRECTION

PATENT NO. : 8,580,332 B2
APPLICATION NO. : 12/882009
DATED : November 12, 2013
INVENTOR(S) : Byung-Sung Kwak and Nety Krishna It is certified that error appears in the above-identified patent and that said Letters Patent is hereby corrected as shown below:

In the Claims
Column 8, Claim 5, second line, delete "for".
Column 8, Claim 6, second line, delete "for".
Column 8, Claim 7, second line, delete "for".

Signed and Sealed this
Eighteenth Day of February, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,580,332 B2
APPLICATION NO. : 12/882009
DATED : November 12, 2013
INVENTOR(S) : Byung-Sung Kwak and Nety Krishna It is certified that error appears in the above-identified patent and that said Letters Patent is hereby corrected as shown below:

In the Claims
Column 8, Claim 5, line 45, delete "for".
Column 8, Claim 6, line 49, delete "for".
Column 8, Claim 7, line 54, delete "for".

This certificate supersedes the Certificate of Correction issued February 18, 2014.

Signed and Sealed this
Twenty-fifth Day of March, 2014

Michelle K. Lee
*Deputy Director of the United States Patent and Trademark Office*